(12) United States Patent
Dalton et al.

(10) Patent No.: US 7,764,886 B2
(45) Date of Patent: Jul. 27, 2010

(54) BURST MODE OPTICAL RECEIVER

(75) Inventors: Rodger Dalton, Wake Forrest, NC (US); Eugen H. Ruegg, Cary, NC (US); Gary Miller, Raleigh, NC (US)

(73) Assignee: Alcatel Lucent, Paris (FR)

( * ) Notice: Subject to any disclaimer, the term of this patent is extended or adjusted under 35 U.S.C. 154(b) by 938 days.

(21) Appl. No.: 11/383,110

(22) Filed: May 12, 2006

(65) Prior Publication Data

US 2007/0122163 A1    May 31, 2007

Related U.S. Application Data

(60) Provisional application No. 60/740,099, filed on Nov. 28, 2005.

(51) Int. Cl.
*H04B 10/06*    (2006.01)

(52) U.S. Cl. ............... 398/208; 398/207; 398/210

(58) Field of Classification Search .......... 398/202–214
See application file for complete search history.

(56) References Cited

U.S. PATENT DOCUMENTS

| 3,641,274 A | 2/1972 | Sasaki et al. |
| 4,731,880 A | 3/1988 | Ault et al. |
| 5,208,693 A | 5/1993 | Arstein et al. |
| 6,362,911 B1 | 3/2002 | Lee et al. |
| 7,109,466 B2* | 9/2006 | Park et al. ............ 250/214 A |
| 2003/0067662 A1* | 4/2003 | Brewer et al. ............ 359/189 |
| 2007/0023615 A1* | 2/2007 | Ruegg et al. ............ 250/214 R |
| 2007/0066228 A1* | 3/2007 | Leinonen et al. ......... 455/67.11 |
| 2007/0146080 A1* | 6/2007 | Ivry ........................ 330/308 |

FOREIGN PATENT DOCUMENTS

| EP | 0451289 A1 | 10/1991 |
| EP | 0720319 A2 | 7/1996 |
| EP | 1172955 A2 | 1/2002 |
| GB | 2171577 A | 8/1986 |

OTHER PUBLICATIONS

Uhlhorn, R. W.; Proceedings of the IEEE National Aerospace and Electronics Conference 1998 (NAECON 1998); Jul. 13-17, 1998; pp. 160-167.

* cited by examiner

*Primary Examiner*—Dzung D Tran
(74) *Attorney, Agent, or Firm*—RG&Associates

(57) ABSTRACT

A system, method, and computer readable medium for burst mode optical receiver that enables an optical receiver to receive signals from a plurality of optical network units at different optical power levels comprising, collecting Received Signal Strength Indication information from a previous data stream of an optical network unit, and adjusting an optical receiver to optimize reception of subsequent incoming data streams of the optical network unit based upon Received Signal Strength Indication information received from the previous data stream.

7 Claims, 5 Drawing Sheets

BURST MODE OPTICAL RECEIVER

CROSS REFERENCE TO RELATED APPLICATIONS

The present patent application is related to and claims the benefit of provisional patent application No. 60/740,099, filed on Nov. 28, 2005, entitled BURST MODE OPTICAL RECEIVER, the entire contents of which are enclosed by reference herein.

BACKGROUND OF THE INVENTION

A Passive Optical Network (PON) consists of an Optical Line Terminator (OLT), which resides in a Central Office (CO). The optical line terminator services a number of Optical Network Units (ONUs) typically connected in a star arrangement using optical splitters, which reside at a premise of a user. The upstream data on the passive optical network going from the optical network units to the optical line terminator is time-multiplexed between the multiple optical network units. Since each optical network unit may be located at a different distance from the optical line terminator, the amplitude of the upstream signal, seen at the optical line terminator, varies between optical network units. A problem occurs when two optical network units send consecutive bursts of data that are at very different power levels.

Current burst-mode optical receiver technology cannot predict the power level of a forthcoming burst of data seen at the receiver of an optical line terminator. This results in a need for long packet preambles in order to satisfy the optical dynamic range requirements for optical line terminator burst-mode input signals as specified in the International Telecommunications Union (ITU) Gigabit Passive Optical Network (GPON) standard (G.984) and ITU Broadband Passive Optical Network (BPON) standard (G.983). These long preambles effectively waste upstream bandwidth of the passive optical network. No current approach utilizes either the Media Access Control (MAC) to assist the optical receiver or utilizes an amplifier to Direct Current (DC) bias the data line to obtain a solution to different incoming optical power levels. The MAC assisted approach leverages the forward looking view of the MAC in that it has specific knowledge of which ONU is scheduled to arrive upstream next and it can use that information to precondition the receiver. In theory, such a receiver could function with almost no preamble at all. The reset based approach using the DC amplifier circuit is a reactive approach that will always require some amount of preamble to train on.

The passive optical network media access controller has advanced knowledge of which optical network units will be transmitting in an upstream frame. Therefore what is needed is a circuit that the Passive Optical Network (PON) Media Access Controller (MAC) be utilized to assist the Burst-Mode optical Receiver (BMRX) in the task of quickly adjusting to various input power levels in order to shorten the required amount of preamble needed for training. This shorter preamble will effectively lead to increased upstream bandwidth on the passive optical network. The present invention provides a system, method, and computer readable medium that allows the passive optical network media access controller to assist the burst mode receiver to reduce the time required between upstream cells and upstream preamble length, which increases effective bandwidth of the passive optical network.

SUMMARY OF THE INVENTION

Passive optical network systems such as those specified in the ITU GPON standard (G.984) and ITU BPON standard (G.983) require specialized burst-mode optical receivers having the capability to receive signals from multiple optical network units each at a different optical power level. The ability to receive signals at different optical power levels has proven to be a challenging design task for the telecommunications industry. Multiple custom silicon integrated circuits have failed to provide an adequate solution. No current approach utilizes the media access controller or utilizes an amplifier to DC bias the data line to obtain a solution to different incoming optical power levels to the burst mode optical receiver.

The optical line terminator services a number of optical network units connected in a star arrangement using optical splitters, which reside at premise of a user. The upstream data on the passive optical network going from the optical network units to the optical line terminator is time-multiplexed between the multiple optical network units. Since each optical network unit may be located at a different physical distance from the optical line terminator, the amplitude of the upstream signal, seen at the optical line terminator, varies from one optical network unit to the next. Obtaining error-free data reception is challenging when two optical network units send consecutive bursts of data that are at very different power levels.

Current burst-mode optical receiver technology can not predict the power level of the forthcoming burst of data seen at the receiver of an optical line terminator. Therefore the receiver of the optical line terminator is required to train itself to each upstream packet in order to receive the data error free. The receiver training is performed on dummy data called preamble which is typically a repetitive sequence of 101010 bits that the receiver can use to adjust its sampling thresholds but doesn't have to correctly recover since it isn't real data. The insertion of preamble before the actual data payload in the upstream packet reduces the effective upstream bandwidth of the passive optical network. The required training time depends largely on the amplitude differential between consecutive upstream packets with the worst case being either a high amplitude packet followed by a low amplitude packet, or vice versa. Currently the systems are designed to use a fixed preamble that is long enough to accommodate the largest amplitude difference (e.g. 15 dB). This requires a relatively long preamble can consume up to 20% of the upstream bandwidth in PONs with a large number of ONUs. This results in a requirement for long packet preambles in order to satisfy the optical dynamic range requirements for optical line terminator burst-mode input signals as specified in the ITU GPON standard (G.984). These long preambles effectively waste bandwidth on the passive optical network. This invention reduces the required preamble by DC biasing the AC coupled line to a known level. In one embodiment of the invention, the MAC knows the upstream power level of each ONU and can pre-charge the coupling cap to the correct value before the cell ever arrives. The second approach utilizes a circuit to speed up the charging of the coupling cap after the cell has arrived. By utilizing the media access controller data to Direct Current (DC) bias the burst-mode input signals of the optical line terminator, the preamble can be shortened. This shorter preamble will effectively lead to increased upstream bandwidth on the passive optical network.

The present invention utilizes a passive optical network media access controller information of previous and subsequent upstream cell optical power to determine the charge to inject into coupling capacitors between a Trans-Impedance Amplifier (TIA) and a Limiting Amplifier (LIMA) in order to reduce the recovery time required by the optics between upstream cells. The present invention does not rely on Analog to Digital (A/D) and Digital to Analog (D/A) converters to bring the information from the media access controller into the optical receiver to adjust the AC coupling capacitor voltage. The advantage the present invention provides is to provide a substantial reduction in the amount of preamble required by the burst-mode receiver to reach equalization. This translates into increased upstream bandwidth on the passive optical network.

In one embodiment of the present invention, a method for enabling an optical receiver to receive signals from a plurality of optical network units at different optical power levels comprises collecting Received Signal Strength Indication (RSSI) information from a previous data stream of an optical network unit, and adjusting an optical receiver to optimize reception of subsequent incoming data streams of the optical network unit based upon Received Signal Strength Indication information received from the previous data stream. The method may also comprise estimating the Received Signal Strength Indication after a predetermined interval, estimating the Received Signal Strength Indication in parallel to adjusting the optical receiver using the previously collected the Received Signal Strength Indication, or estimating the Received Signal Strength Indication in parallel to adjusting the optical receiver using the previously collected the Received Signal Strength Indication. The method may additionally comprise storing the collected Received Signal Strength Indication information, linking the collected Received Signal Strength Indication information of the optical network unit and generating a lookup table of the collected Received Signal Strength Indication information of the optical network unit, wherein the collecting occurs in the media access controller and wherein the adjusting is sent from the media access controller. A further embodiment of the invention may have the RSSI levels provisioned by the system user during system startup instead of being measured by circuitry inside the receiver.

In a further embodiment of the present invention, a computer readable medium comprises instructions for estimating Received Signal Strength Indication from a previous data stream to an optical network unit, linking the estimated Received Signal Strength Indication information of the optical network unit, and adjusting an optical receiver to optimize reception of subsequent incoming data streams of the optical network unit based upon Received Signal Strength Indication information received from the previous data stream. The computer readable medium may also comprise instructions for collecting Received Signal Strength Indication information of the previous data stream to the optical network unit, instructions for storing the collected Received Signal Strength Indication information and instructions for generating a lookup table of the collected Received Signal Strength Indication information of the optical network unit, wherein the estimation occurs after a predetermined interval, the estimation occurs in parallel to adjusting the optical receiver or the estimation occurs after adjusting the optical receiver. Another embodiment of the invention may have the RSSI levels provisioned by the system user during system startup instead of being measured by circuitry inside the receiver.

In yet a further embodiment, a system for a burst mode optical receiver comprises a memory, and a media access controller communicably coupled to the memory, the media access controller adapted to, estimate Received Signal Strength Indication to an optical network unit, and adjust an optical receiver by applying a first control voltage, a second control voltage and a third control voltage to optimize reception of an incoming data stream of the optical network unit based upon Received Signal Strength Indication information. The system may also comprise a first Trans-Impedance Amplifier having an inverting output, the first Trans-Impedance Amplifier having a non-inverting output, a first resistor connected to the first Trans-Impedance Amplifier inverting output, a second resistor connected to the first Trans-Impedance Amplifier non-inverting output, a first capacitor connected to the first Trans-Impedance Amplifier inverting output, the first capacitor connected in parallel to the first resistor, a second capacitor connected to the first Trans-Impedance Amplifier non-inverting output, the second capacitor connected in parallel to the second resistor, a third capacitor connected to the first resistor, the third capacitor having a capacitance less than the first capacitor, a fourth capacitor connected to the second resistor, the fourth capacitor having a capacitance less than the second capacitor, a first limiting amplifier having an inverting input connected to the third capacitor and a non-inverting input connected to the fourth capacitor, a first transistor having a gate receiving the first control voltage, the first transistor having a drain connected to supply voltage, the first transistor having a source connected to the first resistor, a second transistor having a gate receiving the second control voltage, the second transistor having a drain connected to the first transistor source, the second transistor having a source connected to ground, a third transistor having a gate receiving the first control voltage, the third transistor having a drain connected to supply voltage, the third transistor having a source connected to the second resistor, a fourth transistor having a gate receiving the second control voltage, the fourth transistor having a drain connected to the third transistor source, the fourth transistor having a source connected to ground, a fifth transistor having a gate receiving the third control voltage, the fifth transistor having a drain connected to supply voltage, the fifth transistor having a source connected to the first limiting amplifier non-inverting input, and a sixth transistor having a gate receiving the third control voltage, the sixth transistor having a drain connected to supply voltage, the sixth transistor having a source connected to the first limiting amplifier inverting input.

Figure 4:
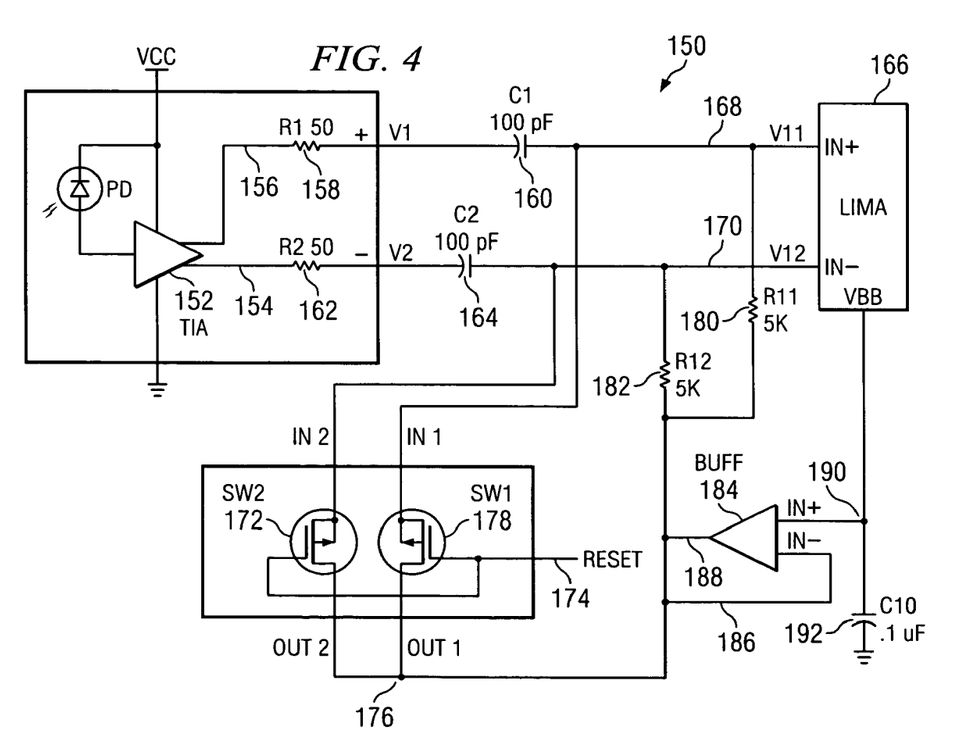
FIG. 4 depicts a second embodiment of the system of burst mode optical receiver in accordance with a preferred embodiment of the present invention.

An alternative embodiment of the system, FIG. 4, may also comprise a second Trans-Impedance Amplifier having an inverting output, the second Trans-Impedance Amplifier having a non-inverting output, a third resistor connected to the second Trans-Impedance Amplifier non-inverting output, a fifth capacitor connected to the third resistor, a fourth resistor connected to the second Trans-Impedance Amplifier inverting output, a sixth capacitor connected to the fourth resistor, a second limiting amplifier having a non-inverting input connected to the fifth capacitor and an inverting input connected to the sixth capacitor, a seventh transistor having a drain connected to the second Trans-Impedance Amplifier non-inverting output, the seventh transistor having a gate connected to a reset junction receiving the third control voltage, the seventh transistor having a source, an eighth transistor having a drain connected to the second Trans-Impedance Amplifier inverting output, the eighth transistor having a gate connected to the reset junction, the eighth transistor having a source, a fifth resistor connected to the second limiting amplifier non-inverting input, a sixth resistor connected to the second limiting amplifier inverting input, the sixth resistor connected to the fifth resistor, a buffer amplifier having an inverting input connected to the seventh transistor source, the buffer amplifier inverting input connected to the eight transistor source, the buffer amplifier output connected to the buffer amplifier inverting input, the buffer output connected to fifth resistor, the buffer output connected to the sixth resistor, the buffer amplifier having a non-inverting input, and a seventh capacitor connected to ground, the seventh capacitor connected to the buffer amplifier non-inverting input.

Figure 5:
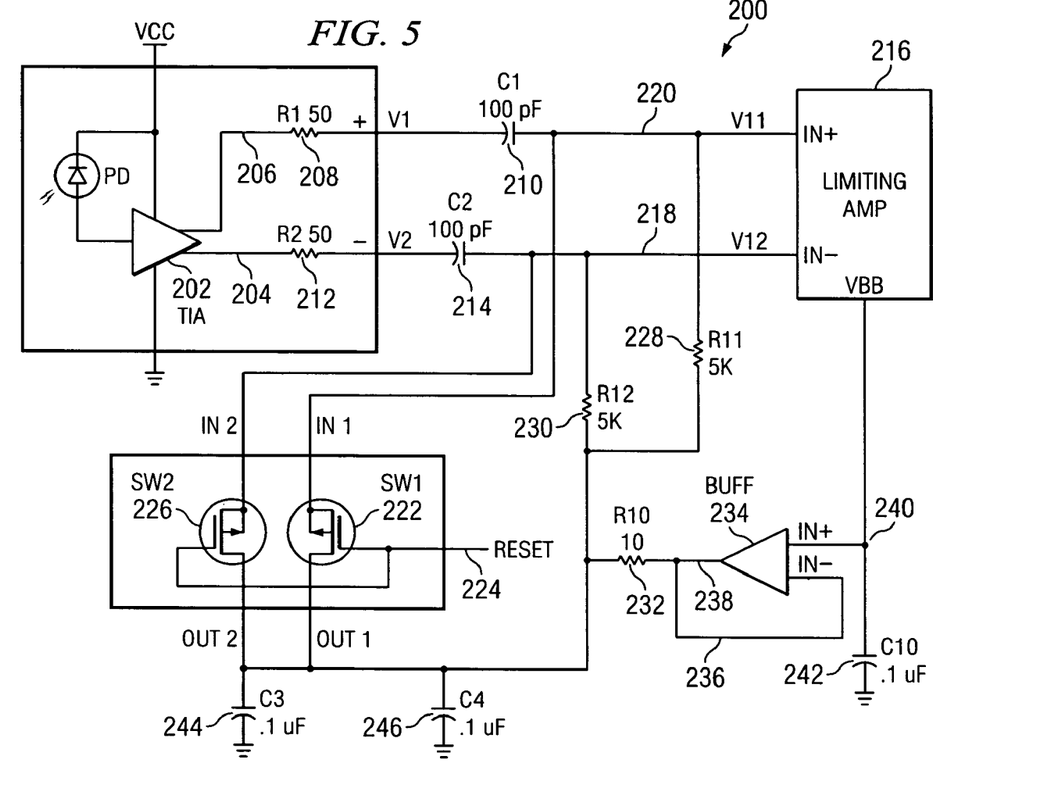
FIG. 5 depicts a third embodiment of the system of burst mode optical receiver in accordance with a preferred embodiment of the present invention.

In yet another embodiment of the system, FIG. 5, may comprise a second Trans-Impedance Amplifier having an inverting output, the second Trans-Impedance Amplifier having a non-inverting output, a third resistor connected to the second Trans-Impedance Amplifier non-inverting output, a fifth capacitor connected to the third resistor, a fourth resistor connected to the second Trans-Impedance Amplifier inverting output, a sixth capacitor connected to the fourth resistor, a second limiting amplifier having an inverting input connected to the fifth capacitor and a non-inverting input connected to the sixth capacitor, a seventh transistor having a drain connected to the second Trans-Impedance Amplifier non-inverting output, the seventh transistor having a gate connected to a reset junction receiving the third control voltage, the seventh transistor having a source, an eighth transistor having a drain connected to the second Trans-Impedance Amplifier inverting output, the eighth transistor having a gate connected to the reset junction, the eighth transistor having a source, the eighth transistor source connected to the seventh transistor source, a fifth resistor connected to the second limiting amplifier non-inverting input, a sixth resistor connected to the second limiting amplifier inverting input, the sixth resistor connected to the fifth resistor, the connection of the sixth resistor to the fifth resistor connected to the eighth transistor source, a seventh resistor connected to the connection of the fifth and sixth resistor, a buffer amplifier having an inverting input, the buffer amplifier having an output connected to the buffer amplifier inverting input, the buffer output connected to the seventh resistor, the buffer amplifier having a non-inverting input, a seventh capacitor connected to ground, the seventh capacitor connected to the buffer amplifier non-inverting input, an eighth capacitor connected to the seventh transistor source, the eighth capacitor connected to ground, and a ninth capacitor connected to the eighth transistor source, the ninth capacitor connected to ground.

DETAILED DESCRIPTION OF THE INVENTION

Figure 1:
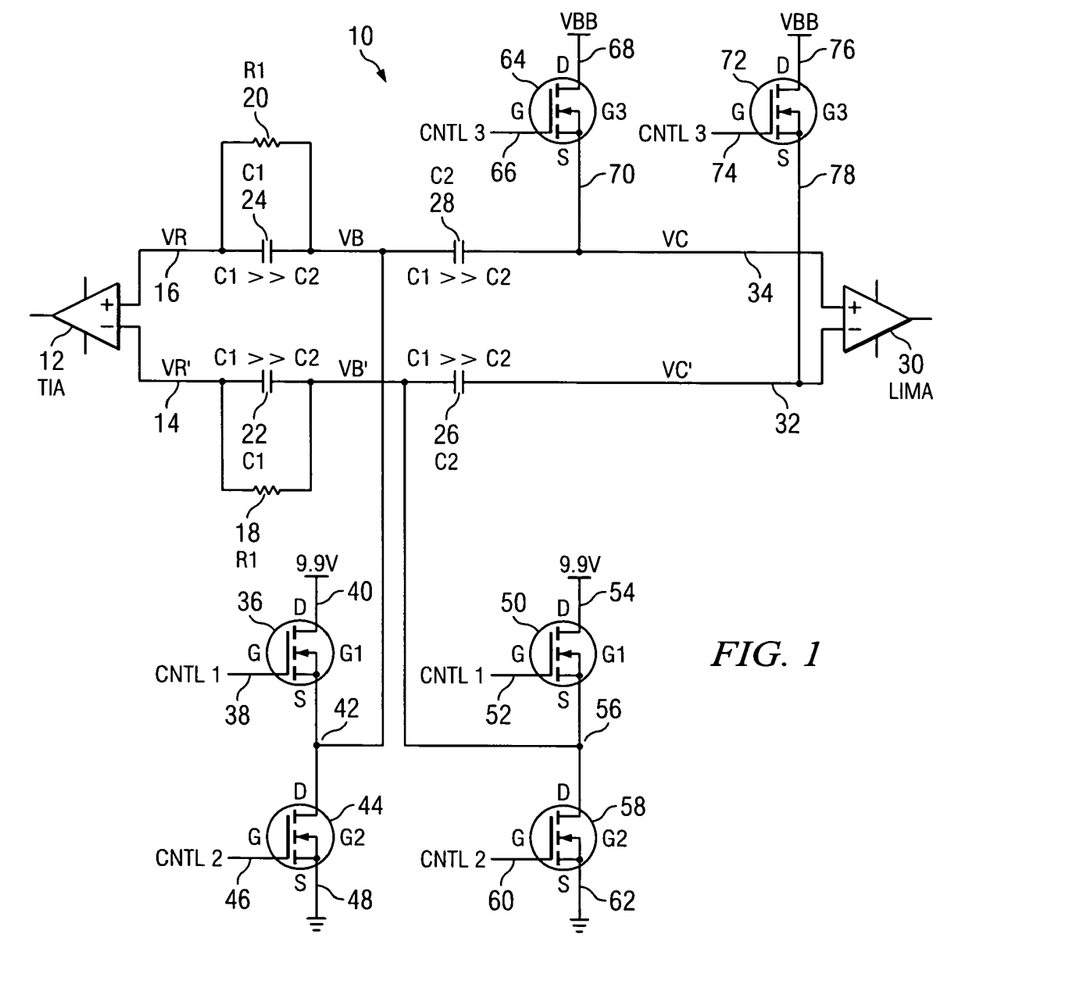
FIG. 1 depicts a first embodiment of the system of burst mode optical receiver in accordance with a preferred embodiment of the present invention.

Referring now to FIG. 1, a first system 10 of burst mode optical receiver is depicted. The first embodiment of the invention comprises a first Trans-Impedance Amplifier 12 has an inverting output 14 and a non-inverting output 16. A first resistor 18 is connected to the first Trans-Impedance Amplifier inverting output and a second resistor 20 is connected to the non-inverting output. A first capacitor 22 is connected to the first Trans-Impedance Amplifier inverting output wherein the first capacitor connected in parallel to the first resistor. A second capacitor 24 is connected to the first Trans-Impedance Amplifier non-inverting output wherein the second capacitor is connected in parallel to the second resistor. A third capacitor is 26 is connected to the first resistor and has a capacitance less than the first capacitor. A fourth capacitor 28 is connected to the second resistor and has a capacitance less than the second capacitor. A first limiting amplifier 30 has an inverting input 32 and is connected to the third capacitor. The first limiting amplifier has a non-inverting input 34 connected to the fourth capacitor. A first transistor 36 has a gate 38 receiving the first control voltage and a drain 40 connected to supply voltage and a source 42 connected to the first resistor. A second transistor 44 has a gate 46 receiving the second control voltage, a drain connected to the first transistor source and a source 48 connected to ground. A third transistor 50 has a gate 52 receiving the first control voltage, a drain 54 connected to supply voltage and a source 56 connected to the second resistor. A fourth transistor 58 has a gate 60 receiving the second control voltage, a drain connected to the third transistor source and a source 62 connected to ground. A fifth transistor 64 has a gate 66 receiving the third control voltage, a drain 68 connected to supply voltage and a source 70 connected to the first limiting amplifier non-inverting input. A sixth transistor 72 has a gate 74 receiving the third control voltage, a drain 76 connected to supply voltage and a source 78 connected to the first limiting amplifier inverting input. These blocks or modules are software, hardware, firmware, and/or the combination of software, hardware, and/or firmware.

The present invention utilizes the passive optical network media access controller's knowledge to facilitate the adjustment in Alternating Current (AC) coupling capacitor voltage to reduce the recovery time between upstream cells required by the optics. The present invention does not rely on Analog to Digital (A/D) and Digital to Analog (D/A) converters to bring the information from the media access controller into the optical receiver to adjust the AC coupling capacitor voltage. The passive optical network media access controller uses its advanced knowledge of the previous and subsequent upstream cell optical powers to determine how much charge to inject into the coupling capacitors between the TIA and LIMA. The advantage the present invention provides is a substantial reduction in the amount of preamble required by the burst-mode receiver to reach equalization. This translates into increased upstream bandwidth on the passive optical network.

The left hand side of the present invention is the differential output from a Trans-Impedance Amplifier (TIA). The right hand side device is a Limiting Amplifier (LIMA) differential input. In a typical Ethernet Passive Optical Network (EPON) style optical module these two devices (TIA/LIMA) are AC coupled to each other with a single series capacitance in each leg of the differential signal (eg. 26 and 28) similar to FIG. 3.

The TIA and the LIMA are AC coupled due to the output signal from the TIA having a common-mode voltage that is proportional to the average optical power seen by the photo-diode at the TIA input. The LIMA requires its input to be biased to a constant common-mode voltage (VBB). Therefore, the voltage V R-C that exists between points R and C assumes a different value that depends on the average optical power received.

Presently, Ethernet Passive Optical Network (EPON) design requires large amounts of preamble so that AC capacitors have time to charge or discharge to the appropriate value. One of the reasons this takes a relatively long time is because the biasing circuit at the input of the LIMA is high impedance in order to avoid unwanted attenuation that will degrade receiver sensitivity. However, the high input impedance of the LIMA reduces the amount of current that can be drawn from the output of the TIA. It is this TIA output current that is required to charge the coupling capacitors to the final value and a smaller current translates into a longer time for the capacitors to stabilize. During this stabilization time the signal at the LIMA input is not centered on VBB and the LIMA produces extreme duty cycle distortion which will prevent clock recovery devices from activating until the duty cycle distortion subsides. Large amounts of preamble required corresponding to 20% wasted upstream bandwidth.

The present invention utilizes the PON MAC to receive Received Signal Strength Indication (RSSI) information to adjust the coupling capacitor on the optical receiver before the data stream arrives.

During the guard time 62 (also see reference numeral 84 in FIG. 2), between upstream packets, the passive optical network media access controller will assert CNTL3 to the Q5 and Q6 transistors. This will hold node C at VBB through low impedance. Then the media access controller will apply a variable width pulse to either CNTL1, or to CNTL2. CNTL1 is used to raise the voltage on the coupling capacitors, while CNTL2 is used to lower the voltage on the coupling capacitors. The width of the pulse controls the amount of charge injected or removed from node B. In this manner, voltage V B-C can be quickly adjusted to any desired value between 3.3V and ground. After a brief time, all CNTL signals are de-asserted; the adjustment circuit is then high impedance relative to the original signal path so as not to degrade the receiver's sensitivity during normal operation. Since C1>>C3 the majority of the AC coupling voltage appears across capacitor C3 (V B'-C') and is fully adjustable by the media access controller. The voltage on capacitor C1 is therefore zero or very close to zero. The resistor R1 is used to keep capacitor C1 bled down (discharged). In an alternate embodiment the resistor R1 is replaced with a Field Effect Transistor (FET).

The circuit is characterized in advance to develop a look up table for the media access controller. If the previous packet is at power level X and the next packet is at power level Y, then the lookup table will show whether to drive CNTL1 or CNTL2, and how long to drive it. The end result is that before the guard time is over, the coupling capacitors will already be at the correct common-mode voltage so that when the preamble starts, the signal at the input of the LIMA will already be centered about $V_{BB}$ which will prevent duty cycle distortion of the LIMA's data output.

Figure 2:
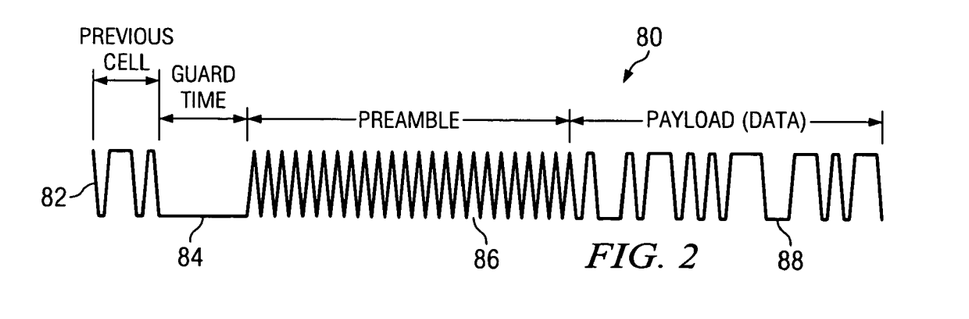
FIG. 2 depicts overhead protocol in accordance with ITU G.984 GPON Standards.

Referring now to FIG. 2 the overhead protocol 80 is shown. The protocol contains a previous cell data stream 82, followed by guard time 84, after which a preamble 86 precedes the payload data 88 of the subsequent data stream.

Figure 3:
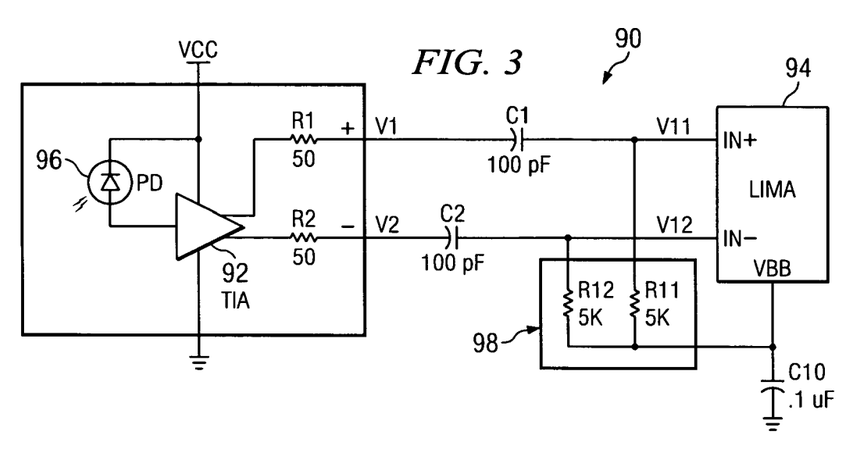
FIG. 3 depicts a system of burst mode optical receiver with AC coupling without reset.

Referring now to FIG. 3, a typical prior art system of burst mode optical receiver with AC coupling without reset is shown 90. The system has a Trans-Impedance Amplifier 92, communicating with an optical receiver 96. The Trans-Impedance Amplifier is connected to the limiting amplifier 94, which relies on bleed down resistors 98 to set the bias. The capacitors C1 & C2 together with R11 & R12 form an RC circuit with a time constant of 100 pF×5 kohm=500 ns. That means that at a data rate of 1244 Mb/s it will take up to 600 bits (75 Bytes) to recover from the cell to cell transition.

If this discharge time could be shortened, many bytes of preamble could be saved during the transition. This can be established by using a reset circuit to hasten the charge equalization.

Referring now to FIG. 4, a second system 150 of burst mode optical receiver is depicted. The second embodiment of the invention comprises a second Trans-Impedance Amplifier 152 which has an inverting output 154 and a non-inverting output 156. A third resistor 158 is connected to the second Trans-Impedance Amplifier non-inverting output. A fifth capacitor 160 is connected to the third resistor. A fourth resistor 162 is connected to the second Trans-Impedance Amplifier inverting output. A sixth capacitor 164 is connected to the fourth resistor. A second limiting amplifier 166 has a non-inverting input 168 connected to the fifth capacitor and an inverting input 170 connected to the sixth capacitor. A seventh transistor 172 has a drain connected to the second Trans-Impedance Amplifier non-inverting output and a gate 174 connected to a reset junction receiving the third control voltage. The seventh transistor has a source 176. An eighth transistor 178 has a drain connected to the second Trans-Impedance Amplifier inverting output and a gate connected to the reset junction. The eighth transistor has a source. A fifth resistor 180 is connected to the second limiting amplifier non-inverting input. A sixth resistor 182 is connected to the second limiting amplifier inverting input. The sixth resistor is connected to the fifth resistor. A buffer amplifier 184 has an inverting input 186 connected to the seventh transistor source and an output 188 connected to the buffer amplifier inverting input. The buffer output is connected to the fifth and sixth resistor. The buffer amplifier has a non-inverting input 190. A seventh capacitor 192 is connected to ground; the seventh capacitor is connected to the buffer amplifier non-inverting input.

The coupling capacitor is discharged so that the quiescent voltage across the cap will depend on the input optical power level, which is the ideal bias point for the Limiting Amplifier (LIMA) input. The VBB is generated in the LIMA, but has limited drive capability. We propose to inset a buffer amplifier which has a high impedance input and a low impedance output that tracks the input voltage without loading the VBB output of the LIMA. The low output impedance of the buffer amplifier (less than 10 ohms) will discharge the 100 pF capacitor in about 1 ns; that is 500 times faster than without the reset circuit.

Referring now to FIG. 5, a third system 200 of burst mode optical receiver is depicted. In the third embodiment of the invention a second Trans-Impedance Amplifier 202 has an inverting output 204 and a non-inverting output 206. A third resistor 208 is connected to the second Trans-Impedance Amplifier non-inverting output. A fifth capacitor 210 is connected to the third resistor. A fourth resistor 212 is connected to the second Trans-Impedance Amplifier inverting output. A sixth capacitor 214 is connected to the fourth resistor. A second limiting amplifier 216 has an inverting input 218 connected to the sixth capacitor and a non-inverting input 220 connected to the fifth capacitor. A seventh transistor 222 has a drain connected to the second Trans-Impedance Amplifier non-inverting output and a gate connected to a reset junction 224 receiving the third control voltage. The seventh transistor has a source. An eighth transistor 226 has a drain connected to the second Trans-Impedance Amplifier inverting output and a gate connected to the reset junction. The eighth transistor has a source connected to the seventh transistor source. A fifth resistor 228 is connected to the second limiting amplifier non-inverting input. A sixth resistor 230 is connected to the second limiting amplifier inverting input. The sixth resistor is connected to the fifth resistor. The junction of the sixth resistor to the fifth resistor is connected to the eighth transistor source. A seventh resistor 232 is connected to the connection of the fifth and sixth resistor. A buffer amplifier 234 has an inverting input 236 and an output 238 connected to the buffer amplifier inverting input and to the seventh resistor. The buffer amplifier has a non-inverting input 240. A seventh capacitor 242 is connected to ground and to the buffer amplifier non-inverting input. An eighth capacitor 244 is connected to the seventh transistor source and to ground. A ninth capacitor 246 is connected to the eighth transistor source and to ground.

The present invention applies a reset signal for a short time typically 10 to 20 ns. The coupling capacitors will be charged or discharged such that at the end of the reset pulse the data is fully acceptable. The existing solution will need various lengths of time to end the transition: The larger the level differences between cells, the longer it takes to get acceptable data. With this new method of charging, or discharging, of the capacitors on the AC coupled lines the preamble can be substantially shortened leading to greater bandwidth on the passive optical network.

The reset pulse will discharge the previous cell level during the guard time. When the new cell arrives and starts the preamble, only a few bits are required to charge the capacitors to the required level. The speed of charging depends on the switches ON resistance and the TIA output impedance, but is generally very short.

Figure 6:
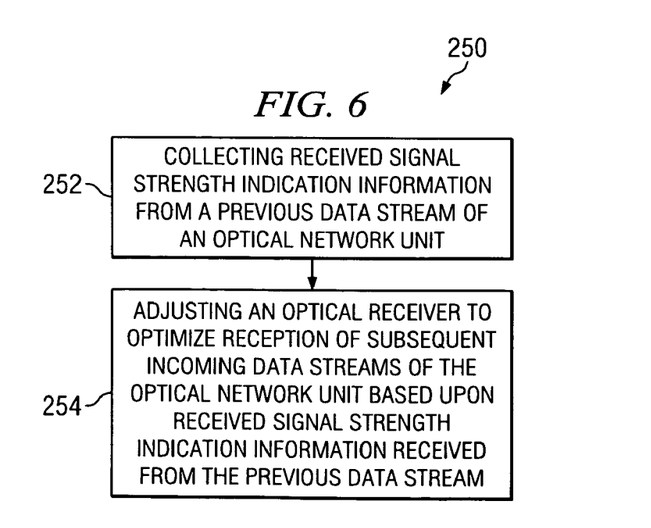
FIG. 6 depicts a first method flow diagram of burst mode optical receiver in accordance with a preferred embodiment of the present invention.

Referring now to FIG. 6, a first flow diagram of the method 250 of passive optical network media access controller assisted clock recovery is depicted. The method enables an optical receiver to receive signals from a plurality of optical network units at different optical power levels comprising, collecting 252 Received Signal Strength Indication information from a previous data stream of an optical network unit, and adjusting 254 an optical receiver to optimize reception of subsequent incoming data streams of the optical network unit based upon Received Signal Strength Indication information received from the previous data stream. The method may be implemented by software, hardware, firmware, and/or the combination of software, hardware, and/or firmware.

Figure 7:
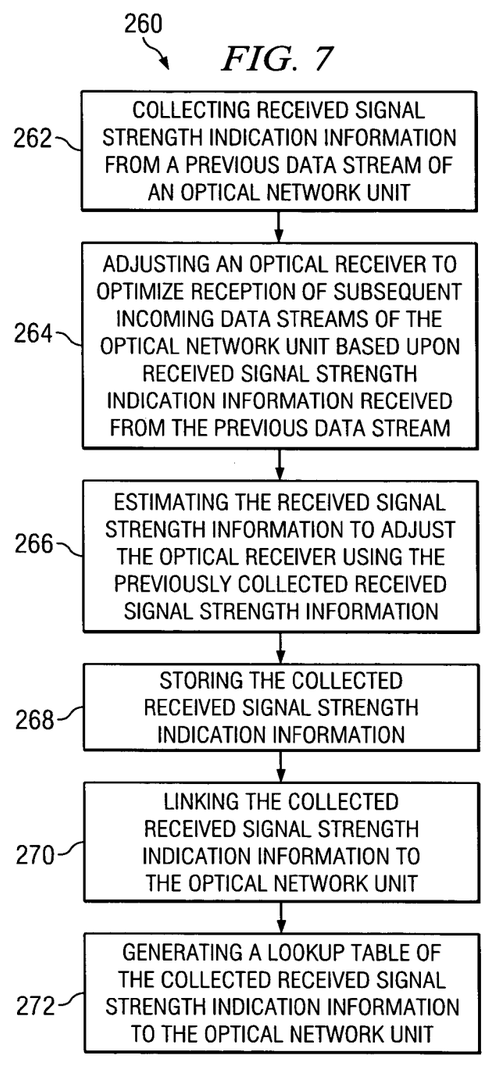
FIG. 7 depicts a second method flow diagram of burst mode optical receiver in accordance with a preferred embodiment of the present invention.

Referring now to FIG. 7, a second flow diagram of the method 260 of passive optical network media access controller assisted clock recovery is depicted. The method enables an optical receiver to receive signals from a plurality of optical network units at different optical power levels comprising, collecting 262 Received Signal Strength Indication information from a previous data stream of an optical network unit, and adjusting 264 an optical receiver to optimize reception of subsequent incoming data streams of the optical network unit based upon Received Signal Strength Indication information received from the previous data stream. The method also comprises estimating 266 the Received Signal Strength Indication to adjust the optical receiver using the previously collected the Received Signal Strength Indication, storing 268 the collected Received Signal Strength Indication information, linking 270 the collected Received Signal Strength Indication information of the optical network unit and generating 272 a lookup table of the collected Received Signal Strength Indication information of the optical network unit. The method may be implemented by software, hardware, firmware, and/or the combination of software, hardware, and/or firmware.

Figure 8:
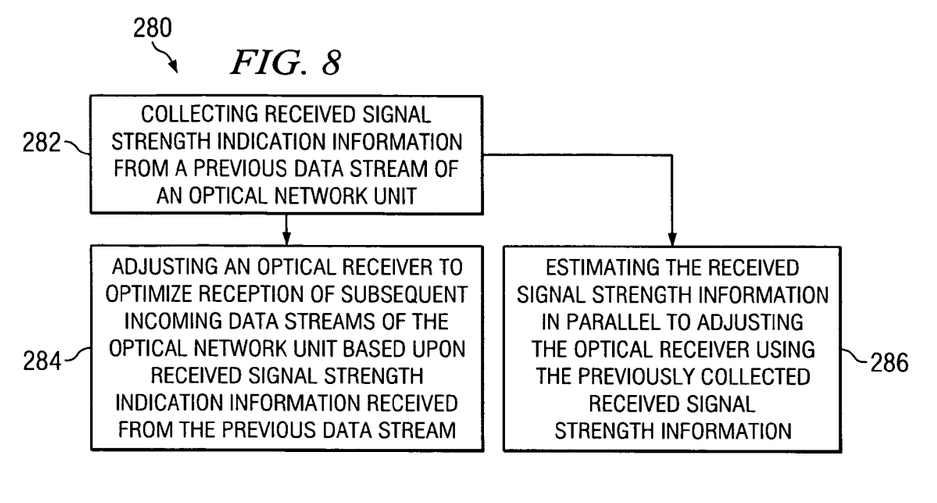
FIG. 8 depicts a third method flow diagram of burst mode optical receiver in accordance with a preferred embodiment of the present invention.

Referring now to FIG. 8, a third flow diagram of the method 280 of passive optical network media access controller assisted clock recovery is depicted. The method enables an optical receiver to receive signals from a plurality of optical network units at different optical power levels comprising, collecting 282 Received Signal Strength Indication information from a previous data stream of an optical network unit, adjusting 284 an optical receiver to optimize reception of subsequent incoming data streams of the optical network unit based upon Received Signal Strength Indication information received from the previous data stream and estimating 286 the Received Signal Strength Indication in parallel to adjusting the optical receiver using the previously collected the Received Signal Strength Indication. The method may be implemented by software, hardware, firmware, and/or the combination of software, hardware, and/or firmware.

Figure 9:
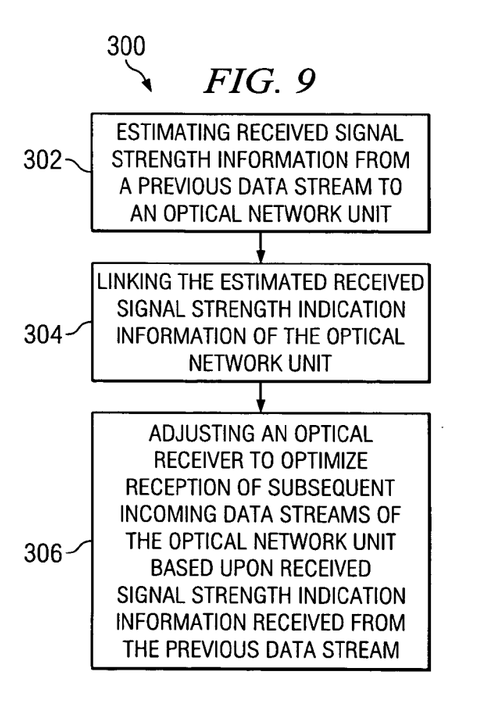
FIG. 9 depicts a first software flow diagram of burst mode optical receiver in accordance with a preferred embodiment of the present invention.

Referring now to FIG. 9, a first software flow diagram of the method 300 of passive optical network media access controller assisted clock recovery is depicted. The computer readable medium comprising instructions for, estimating 302 Received Signal Strength Indication from a previous data stream to an optical network unit, linking 304 the estimated Received Signal Strength Indication information of the optical network unit, and adjusting 306 an optical receiver to optimize reception of subsequent incoming data streams of the optical network unit based upon Received Signal Strength Indication information received from the previous data stream. These steps are performed by software but may also be performed by hardware, firmware, and/or the combination of software, hardware, and/or firmware without departing from the scope of the present invention.

Figure 10:
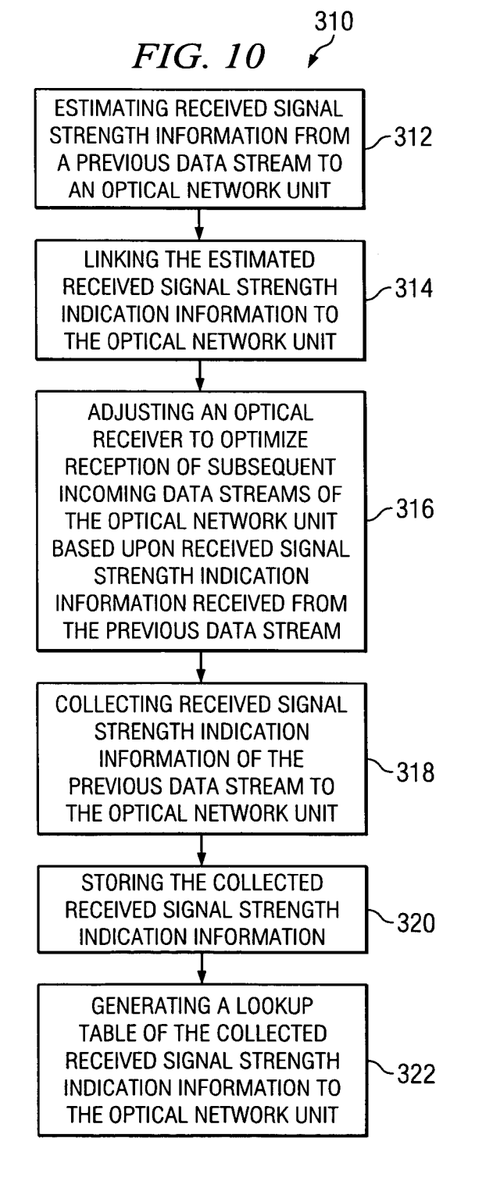
FIG. 10 depicts a second software flow diagram of burst mode optical receiver in accordance with a preferred embodiment of the present invention.

Referring now to FIG. 10, a second software flow diagram of the method 310 of passive optical network media access controller assisted clock recovery is depicted. The computer readable medium comprising instructions for, estimating 312 Received Signal Strength Indication from a previous data stream to an optical network unit, linking 314 the estimated Received Signal Strength Indication information of the optical network unit, adjusting 316 an optical receiver to optimize reception of subsequent incoming data streams of the optical network unit based upon Received Signal Strength Indication information received from the previous data stream. The computer readable medium also comprises instructions for collecting 318 Received Signal Strength Indication information of the previous data stream to the optical network unit, for storing 320 the collected Received Signal Strength Indication information and for generating 322 a lookup table of the collected Received Signal Strength Indication information of the optical network unit. These steps are performed by software but may also be performed by hardware, firmware, and/or the combination of software, hardware, and/or firmware without departing from the scope of the present invention.

Figure 11:
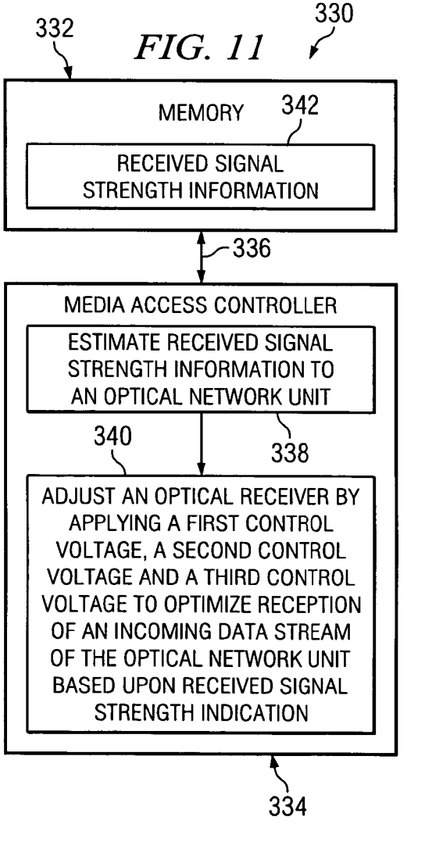
FIG. 11 depicts a fourth embodiment of the system of burst mode optical receiver in accordance with a preferred embodiment of the present invention.

Referring now to FIG. 11, a fourth system 330 of burst mode optical receiver is depicted. The fourth embodiment of the invention comprises, a memory 332, and a media access controller 334 communicably coupled 336 to the memory, the media access controller adapted to, estimate 338 Received Signal Strength Indication 342 to an optical network unit, and adjust 340 an optical receiver by applying a first control voltage, a second control voltage and a third control voltage to optimize reception of an incoming data stream of the optical network unit based upon Received Signal Strength Indication information.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the ONT's, OLT's or media access controllers. Also, these capabilities may be performed in the current manner or in a distributed manner and on, or via, any device able to provide and/or receive broadband signals. Further, although depicted in a particular manner, various modules or blocks may be repositioned without departing from the scope of the current invention. For example, the functionality performed by the media access controller can be self-contained. Still further, although depicted in a particular manner, a greater or lesser number ONT's, OLT's or media access controllers can be utilized with the present invention in order to accomplish the present invention, to provide additional known features to the present invention, and/or to make the present invention more efficient. Also, for example, the MAC to memory communication may be accessed by a cellular phone, a computer with external wireless capability (such as a wireless card) or internal wireless capability (such as 802.11 or any of the other 802 variants), by an Internet Protocol enabled phone, or by any device able to send and/or receive information. The communication described herein occurs via at least one of a wireless protocol, a wired protocol and/or a combination of a wireless protocol and a wired protocol. The blocks or modules described herein are software, hardware, firmware, and/or the combination of software, hardware, and/or firmware.

What is claimed is:

1. A method for enabling an optical receiver to receive signals from a plurality of optical network units at different optical power levels, comprising:

collecting Received Signal Strength Indication information from a previous data stream of an optical network unit via a passive optical network media access controller, sending the Received Signal Strength Indication information to an optical receiver of the optical network unit and reducing recovery time in incoming data streams without the use of an Analog to Digital or Digital to Analog converter; and simultaneously adjusting, via a command from the media access controller, the optical receiver to optimize reception of subsequent incoming data streams of the optical network unit based upon the Received Signal Strength Indication information received from the previous data stream.

2. The method of claim 1 comprising estimating the Received Signal Strength Indication after a predetermined interval.

3. The method of claim 1 comprising estimating the Received Signal Strength Indication in parallel to adjusting the optical receiver using the previously collected the Received Signal Strength Indication.

4. The method of claim 1 comprising estimating the Received Signal Strength Indication in parallel to adjusting the optical receiver using the previously collected the Received Signal Strength Indication.

5. The method of claim 1 comprising storing the collected Received Signal Strength Indication information.

6. The method of claim 1 comprising linking the collected Received Signal Strength Indication information of the optical network unit.

7. The method of claim 1 comprising generating a lookup table of the collected Received Signal Strength Indication information of the optical network unit.

\* \* \* \* \*